United States Patent

[11] 3,626,334

[72] Inventor Robert W. Keyes
Ossining, N.Y.
[21] Appl. No. 889,200
[22] Filed Dec. 30, 1969
[45] Patented Dec. 7, 1971
[73] Assignee International Business Machines Corporation
Armonk, N.Y.

[54] ELECTRICALLY VARIABLE ACOUSTIC DELAY LINE
9 Claims, 6 Drawing Figs.

[52] U.S. Cl. .......... 333/30 R, 333/95 R
[51] Int. Cl. .......... H03h 7/36, H03h 9/00, H03h 9/30
[50] Field of Search .......... 333/30, 1.1, 95; 317/234

[56] References Cited

UNITED STATES PATENTS

| | | | |
|---|---|---|---|
| 3,185,942 | 5/1965 | White | 333/30 |
| 3,200,354 | 8/1965 | White | 333/30 |
| 3,295,064 | 12/1966 | White | 333/30 X |
| 3,457,473 | 7/1969 | Okada et al. | 317/234 |
| 3,488,602 | 1/1970 | Seidel et al. | 333/1.1 X |

*Primary Examiner*—Herman Karl Saalbach
*Assistant Examiner*—Marvin Nussbaum
*Attorneys*—Hanifin and Jancin and George Baron

ABSTRACT: This invention relates to acoustic wave delay lines and, more particularly, to surface acoustic wave delay lines in nonpiezoelectric semiconductors in which the delay can be varied by application of an electrical signal.

INVENTOR
ROBERT W. KEYES

BY George Baron
ATTORNEY

ELECTRICALLY VARIABLE ACOUSTIC DELAY LINE

BACKGROUND OF THE INVENTION

Acoustic delay lines which delay a signal by the time taken for an acoustic wave to pass between two transducers in an acoustic medium have found various uses in technology. The basic principle that makes acoustic delay attractive is that the velocity of acoustic waves is much less than the velocity of electrical signals. A class of waves that has been found to be particularly useful in delay lines is surface waves. A surface wave is one in which the amplitude of the particle motions that constitute the wave are only large very close to the surface. One favorable feature of surface waves is that they can be guided by perturbations applied to the surface, and a considerable art has grown up around these perturbations. See, for example, U.S. Pat. No. 3,406,358 to H. Seidel et al. which issued Oct. 15, 1968. The basic principle of the guiding phenomenon is that the perturbation should be such as to decrease the effective phase velocity in a strip of limited transverse dimensions near the surface. Two such methods of perturbation are particularly relevant to the present invention. One is the deposition of a strip of material of lower velocity on the surface of the substrate. The second is the introduction of particular kinds of impurities into a cylindrical region of the substrate.

Further background information relevant to the present invention is provided by a body of knowledge known as planar semiconductor technology. Planar semiconductor technology enables complex patterns of precisely controlled impurities to be introduced into regions of a semiconductor near its surface, and patterns of many kinds of insulating materials and metals to be deposited on the surface. Planar semiconductor technology is far more advanced in silicon than any other semiconductor, and the use of the planar silicon semiconductor technology provides an unusually convenient means for introducing those perturbations that are useful in controlling surface acoustic waves.

Since acoustic delay lines are commonly used in connection with other electronic apparatus, it is sometimes necessary to have the delay time of the acoustic delay line coincide with some time which is independently determined in another part of the apparatus. It is, therefore, important to be able to adjust the velocity of the acoustic waves in the delay line so that it is perfectly timed with respect to the rest of the electronic apparatus. Such control of the velocity is particularly useful if it can be performed electrically, thereby enabling the control signal to be derived from electrical circuits. Means for varying the velocity of surface waves electrically are known in piezoelectric semiconductors. U.S. Pat. No. 3,200,354 to D. L. White is exemplary of such prior art means. However, such means are of limited usefulness because the most common highly developed and useful form of modern solid state electronics is embodied in silicon, a nonpiezoelectric material.

The basis of the present invention is the discovery that an effect discovered by applicant some years ago and known as the "Electronic Effect in Elastic Constants" can be used to control the velocity of acoustic waves guided by surface waveguides. The electronic effect in elastic constants is a physical effect whereby the presence of electrons or of holes in a semiconductor decreases the elastic constant of the semiconductor. It occurs in semiconductors that have band structures of so-called multivalley type, as exemplified by N-type silicon and N-type germanium, and semiconductors that have the so-called degenerate band structure as exemplified by P-type germanium, P-type silicon, P-type GaAs, and most of the P-type III-V compounds. The theory of the effect and its experimental observation in various semiconductors are reviewed in an article by the inventor in Volume 20 of Solid State Physics published by Academic Press Inc. in 1967. As discussed there, and in references cited therein, decreases of the elastic constant of 5 percent in N-type Ge, 2 percent in N-type Si, and 30 percent in P-type tin telluride have been experimentally observed. These effects are large enough to be used in the guiding of surface acoustic waves. Furthermore, the methods of planar semiconductor technology are especially suited to the introduction of donors and acceptors near the semiconductor surface, as required to take advantage of the electronic effect in the elastic constants for this purpose.

Therefore, it is an object of the present invention to produce surface acoustic waveguides in semiconductor materials.

It is a more particular object of the present invention to produce surface acoustic waveguides with electrically controllable velocity in nonpiezoelectric semiconductors.

It is a still more specific objective of the present invention to produce surface acoustic waveguides with electrically controllable velocity in silicon by the methods of silicon planar technology.

The foregoing and other objects, features and advantages of the invention will be apparent from the following more particular description of the preferred embodiments of the invention as illustrated by the accompanying drawings.

BRIEF DESCRIPTION OF THE DRAWINGS

In FIG. 1, 2 is a block of P-type semiconductor of a kind, such as germanium, that shows the electronic effect in elastic constants. Region 4 is highly doped by conventional diffusion techniques with an N-type impurity, such as arsenic, the latter advantageously having a concentration of about $10^{19}$ donors/cc. The doped portion is shown as a channel 4 and such channel can be made to follow any course, depending upon the shape of the mask used during the diffusion step. At either end of channel 4 are located well-known surface wave transducers 6 and 8. Transducer 6 converts electrical signals from source 10 into acoustical vibrations that travel along waveguide or channel 4 to transducer 8 which converts acoustical energy into electrical signals to be delivered to a utilization device 12.

Figures 1, 2:
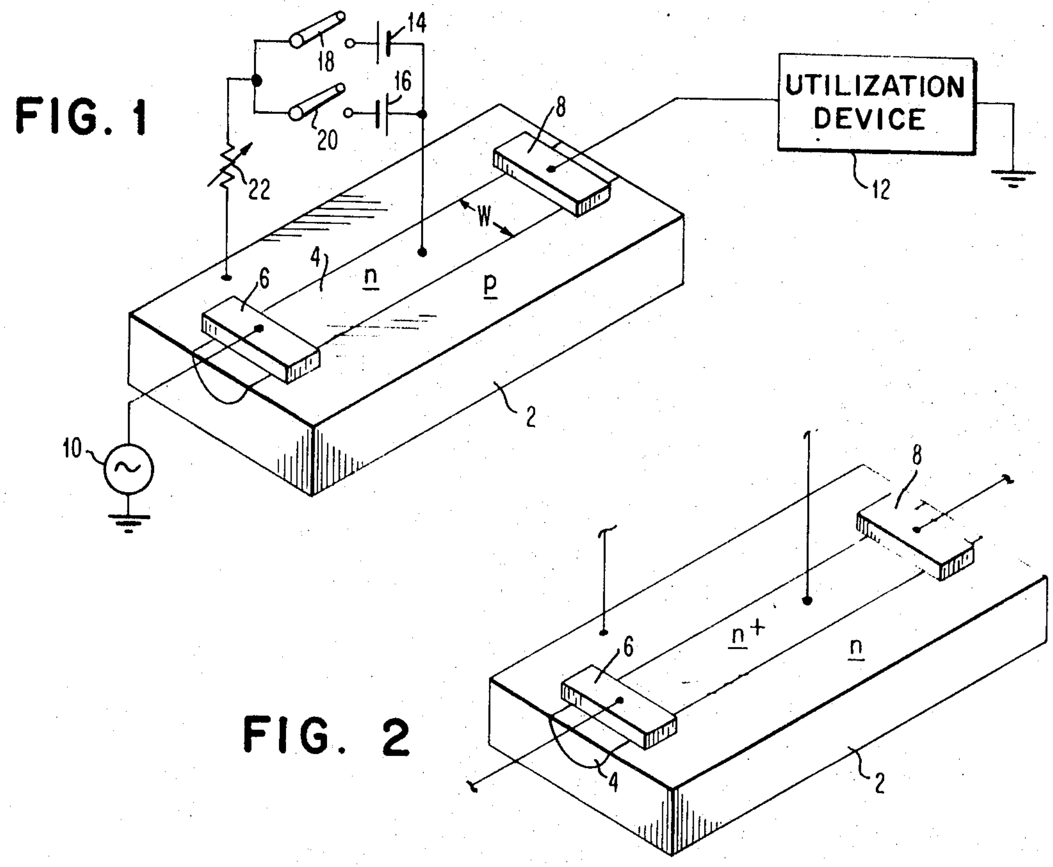
FIGS. 1 and 2 are two embodiments of a variable acoustical delay line employing doped semiconductors.

In doping the bulk P-type semiconductor with N-type region 4, the dopants and substrate 2 are chosen so that the magnitude of the surface wave velocity of the channel 4 is less than that of semiconductor 2. In general, the lower the ratio of the channel 4 velocity to substrate 2 velocity, the stronger is the effect of channel 4 as a waveguide of the acoustical energy entering the germanium from transducer 6. In practice, it has been found that acoustical wave guidance along channel 4 is greatly enhanced by making the thickness of channel 4 less than one-tenth the wavelength of the surface acoustic wave to be guided and by making the width $w$ of such channel 4 less than one-half the wavelength of such acoustic wave.

Once the appropriate channel 4 has been constructed, a waveguide for surface acoustic waves is available. Into this waveguide is introduced a source of biasing potential indicated by battery 14 and battery 16, each connected by a corresponding switch 18 and 20 and a variable resistor 22, for supplying either a forward bias or a reverse bias to the NP-junction formed by channel 4 and semiconductor 2.

The elastic constant of a material indicates, generally, how much energy is needed to strain the material. In heavily doped silicon or germanium, electrons rearrange themselves in accord with the electronic effect in elastic constants among the energy valleys so as to lower the energy of the semiconductor in the strained state, i.e., lowering the value of its elastic constant. If there are fewer electrons available to be rearranged among the energy valleys of, for example, the germanium, there is less lowering of the energy of the crystal in its strained state so that the elastic constant is not accordingly lessened as much in value. As a consequence, when switch 20 is closed and switch 18 is opened, the NP-junction is reverse biased to decrease the electron concentration in the junction region. Such decreased concentration of electrons increases the value of the elastic constant of germanium (or silicon) in the junction region, resulting in an increase in the velocity of the surface acoustic wave being guided by channel 4. When switch 18 is closed and switch 20 is opened, the NP-junction is forward biased, increasing the electron concentration at the NP-junction so as to decrease the value of the elastic constant of the germanium and thus decrease the velocity of the surface acoustical wave being guided by channel 4. Thus, by controlling, at will, the electron concentration at the NP-junction, a variable delay line for a surface acoustic wave is attained without changing the length of the delay line.

In FIG. 2, the wave guiding channel 4 is made using an N-type semiconductor 2 such as silicon or germanium doped with $10^{16}$ donors/cc. of arsenic and channel 4 is heavily doped with $10^{19}$ donors/cc. of arsenic. The selective heavier doping in prescribed paths of the lightly doped semiconductor 2 produces a guidance region for the surface acoustic waves generated by transducer 6 and applied to the channel of FIG. 2. The same forward-biasing and reverse-biasing circuit of FIG. 1 is applied to the channel of FIG. 2 to achieve velocity control.

Figure 3:
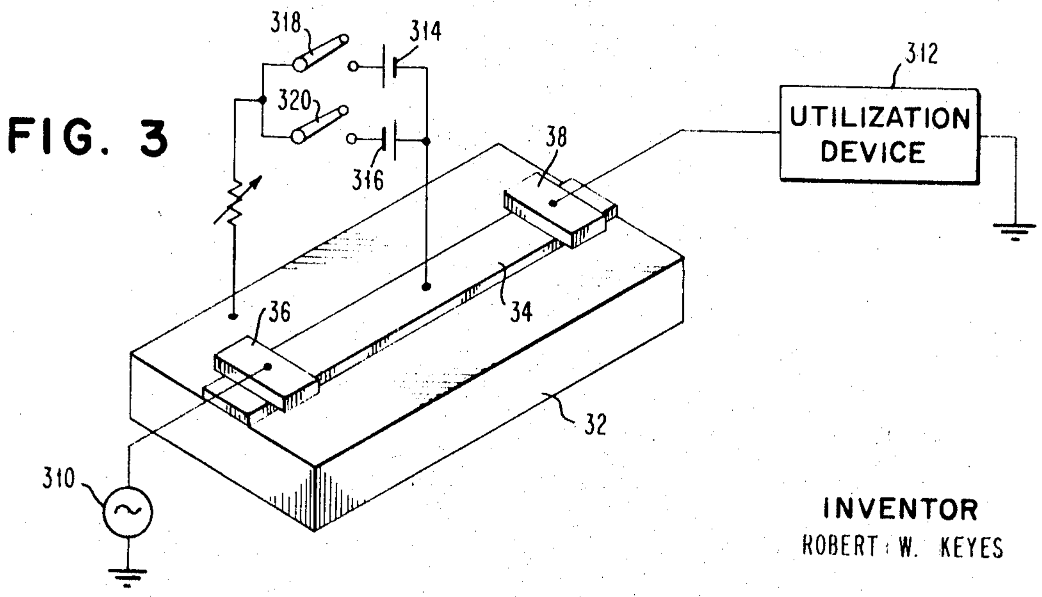
FIG. 3 is a modification of the embodiments of FIGS. 1 and 2 wherein a metal strip is deposited over the doped portion of a semiconductor to provide both acoustical wave guiding and velocity control.

FIG. 3 is another example of how the relationship between the electron concentration in a medium and its elastic constant is employed to achieve a variable acoustical delay line. A semiconductor 32, for example, germanium or silicon, makes a Schottky barrier contact with a strip of metal 34. Strip 34, in accord with the teaching of the prior art, has a lower wave velocity than the underlying semiconductor and serves to form a surface acoustic waveguide. Transducer 36, when driven by electrical energy source 310, supplies surface acoustical waves which travel along the Schottky barrier formed by metal strip 34 and semiconductor 32. The metal strip not only produces the main guiding action of the generated acoustic wave, but forward or reverse bias can be applied to the Schottky barrier contact by means of batteries 314 and 316, by closing of appropriate switch 318 or 320. The biasing effectively changes the carrier or electron concentration in adjacent regions of the semiconductor 32, so as to change the elastic constant of the semiconductor immediately below the metal strip 34, achieving velocity control along the waveguide. The embodiment of FIG. 3 is particularly desirable in that the metal strip 34 serves not only as a waveguide but also as an electrode through which the electron concentration in the vicinity of the Schottky barrier contact can be altered; hence altering the velocity of the acoustic wave being guided. Transducer 38 is a suitable detector of the delayed acoustic wave travelling along the length of the Schottky barrier contact and 312 is a utilization device for said delayed acoustic wave.

Figure 4:
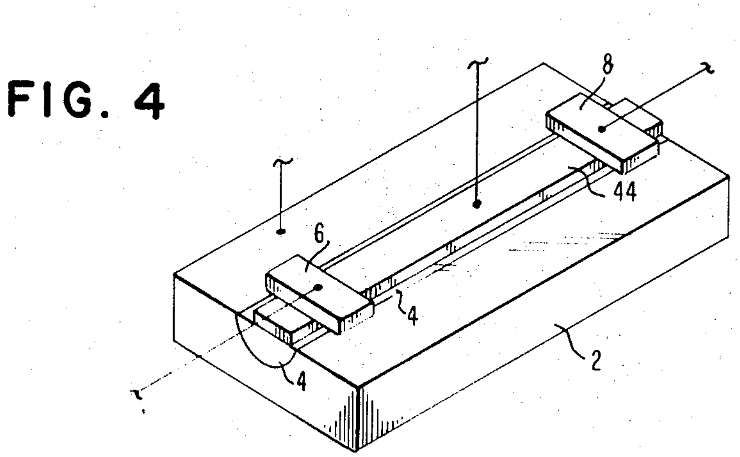
FIG. 4 is another embodiment of the invention wherein a Schottky barrier contact to a semiconductor is employed to provide both acoustical wave guiding and velocity control.

The advantage of using a metal strip as both a waveguide and a control electrode is shown in FIG. 4. Body 2 is a semiconductor material of a type that shows the electronic effect in elastic constants doped with acceptors to a concentration of $10^{16}$ donors/cc. Channel 4 is doped with N-type material to a concentration of about $10^{19}$ donors/cc. The electronic effect in elastic constants causes the elastic constant of channel 4 to be less than the elastic constant of semiconductor 2, thus producing a guiding effect for surface acoustic waves. A metal strip 44 is deposited upon region 4. The metal strip 44 performs two functions, namely, wave guiding of surface acoustic waves and also as an electrode to which a potential can be applied so as to apply a reverse bias to the PN-junction between regions 2 and 4. Since the electronic effect in elastic constants is caused by the presence of the electrons, and the reverse bias decreases the number of electrons in the junction region, the lowering of velocity due to the electronic effect in elastic constants is diminished. As a consequence of such increase in reverse bias, the velocity of the wave confined in waveguide channel 4 is increased.

Figure 5:
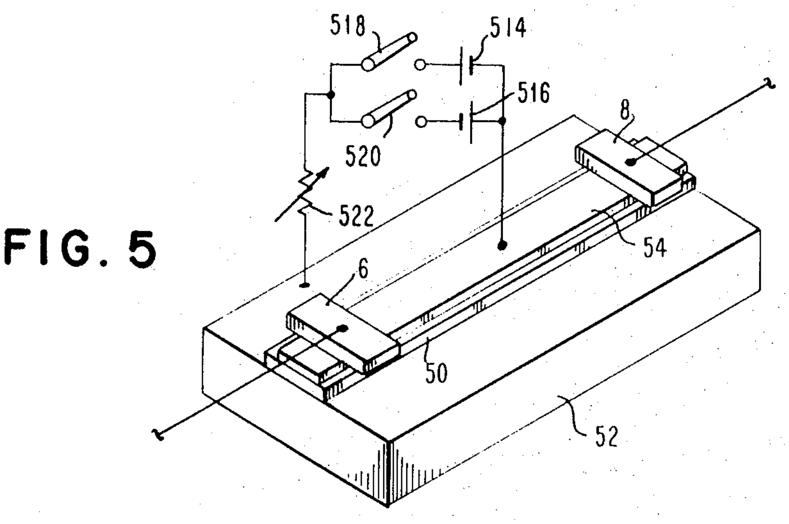
FIG. 5 is a further extension of the invention using the principle of "field-effect" to obtain changes in velocity in acoustic waves through a phonon waveguide region.

Carrier concentrations can be additionally modified as shown in FIG. 5. Here, the guiding channel comprises an insulator 50 that is inserted between semiconductor 52 and metal strip 54 and the metal strip can be either forward or reverse biased by means of batteries 514 and 516. A potential applied to metal 54 creates a field effect that alters the concentration of electrons, e.g., creates an enhancement layer of high electron concentration near the surface of such insulation, and such alteration causes a change in the elastic constant of the semiconductor under the guiding structure and changes the velocity of the surface acoustic waves travelling in the vicinity of the contact between semiconductor 52 and insulator 50. Switches 518, 520 and variable resistor 522 correspond to their companion elements shown in FIGS. 1 and 3.

It will be noted that the general principle of velocity control in the above embodiments involves changing the number of carriers that cause the "electronic effect in elastic constants" by applying a potential to a nonohmic contact to the semiconductor.

Figure 6:
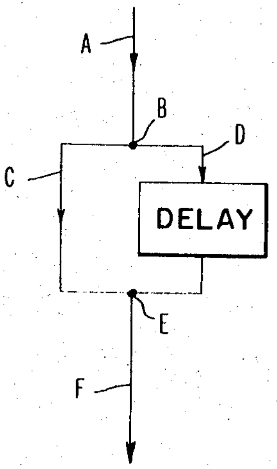
FIG. 6 is a schematic example of how the present invention can be used to perform logic.

FIG. 6 is a schematic showing of how the variable surface acoustic waveguide is employed to provide, for example, the carrying out of logic. An acoustic surface wave is generated and caused to flow along waveguide A. At point B, the acoustic wave divides, part of the wave flowing along path C in phase with part of the wave flowing along part D. Branches C and D join at E to flow along a waveguide channel in path F. The acoustic delay technique discussed hereinabove can be employed in either path C or D to delay one path with respect to the other so that the two waves in paths C and D arrive at E one-half cycle out of phase with each other. When such one-half cycle phase difference is introduced, no acoustical wave appears in path F. If no phase difference is introduced, then the recombined acoustical waves at E appear in path F. Thus FIG. 6 is an acoustical NOR circuit wherein the presence of a signal in either path C or D for producing phase delay removes an acoustical signal from path F.

The principle of controlling the velocity of surface acoustical waves by changing the electron concentration in the path of such waves can be employed wherever delay lines are applicable, i.e., as filters, power dividers, direction couplers, logic-solving and timing devices, etc. Emphasis has been placed in this discussion on the electronic effect on elastic constants for changing the velocity of a surface acoustic wave. How the original waveguide is obtained should not be a limiting factor of the broader aspects of this invention. Besides germanium or silicon, other semiconductors can be used as a supporting substrate. Other semiconductors of the multivalley type or of the degenerate band structure type may be used. The semiconductor can be perturbed by various methods of doping. Ion implantation, alloying, or neutron irradiation of the semiconductor can be relied upon in addition to diffusion to attain the phonon wave-guiding action. Whatever procedure is employed, such procedure must be compatible with the changing of the concentration of electrons in the region near the surface of the semiconductor by electrical means to affect the elastic constant of such semiconductor and, as a consequence, the velocity of an acoustic wave travelling on that surface.

What is claimed is:

1. A variable delay line for acoustic surface waves comprising a nonpiezoelectric semiconductor,
   said semiconductor having a predetermined portion of one of its surfaces modified so as to cause a difference in elastic constant between said modified portion and the remaining portion of said semiconductor,
   means for sending acoustic surface waves along said modified surface, and
   means for altering the number of carriers in said predetermined portion so as to vary its elastic constant.

2. A variable delay line for acoustic surface waves comprising a nonpiezoelectric semiconductor doped to have a given conductivity, a portion of said semiconductor having one of its surfaces doped to produce an opposite conductivity region throughout said portion of the surface, means for sending acoustic surface waves along said doped surface, and means for altering the number of carriers in said doped surface so as to vary the elastic constant of said doped surface.

3. A variable delay line for acoustic surface waves comprising a nonpiezoelectric semiconductor, a metal film contacting a surface of said semiconductor to provide a preferential path for said acoustic surface waves, means for sending acoustic surface waves along said preferential path, and means for altering the number of carriers in said semiconductor via said metal film so as to vary the elastic constant of said semiconductor and thus vary the velocity of said surface acoustic waves.

4. A variable delay line for acoustic surface waves comprising a multivalley-type nonpiezoelectric semiconductor or one having a degenerate band structure, said semiconductor having a predetermined portion of one of its surfaces modified so as to form a junction whereby a difference in elastic constant is created between said modified portion and the remaining portion of said semiconductor, means for sending surface acoustic waves along said junction, and means for changing the concentration of electrons in said junction during the passage of said acoustic waves along said junction.

5. The variable delay line of claim 3 wherein said semiconductor is silicon.

6. The variable delay line of claim 3 wherein said semiconductor is germanium.

7. A variable delay line comprising a multivalley-type nonpiezoelectric semiconductor or one having a degenerate band structure, said semiconductor having a predetermined portion of one of its surfaces doped so as to cause a junction to form whereby a difference in elastic constant is created between said doped portion and semiconductor, a metal strip contacting said doped portion along the length of said junction, means for sending acoustic waves along said junction, means for sending acoustic waves along said junction, and means for applying an electrical potential to said metal strip so as to change the concentration of electrons in said junction.

8. A variable delay line comprising a body of P-type silicon, an insulating layer on said body of silicon, a metal electrode deposited on and along said insulating layer, means for sending surface acoustic waves along the junction region formed between insulator and silicon, and electrical potential means applied to said metal for changing the electron concentration in the junction region so as to alter the velocity of said surface waves.

9. A variable delay line for acoustic surface waves comprising a body of doped silicon of one conductivity type, said body being doped with an opposite conductivity type throughout a selected portion of one surface of said body so as to provide a PN-junction, means for sending surface acoustic waves along said junction, and means for changing the concentration of electrons in said junction during the passage of said acoustic waves along said junction.

* * * * *